United States Patent [19]

Kehlhofer

[11] 4,389,847
[45] Jun. 28, 1983

[54] METHOD FOR THE RAPID INCREASE IN OUTPUT OF A STEAM TURBINE PLANT

[75] Inventor: Rolf Kehlhofer, Dielsdorf, Switzerland

[73] Assignee: BBC Brown, Boveri & Company, Limited, Baden, Switzerland

[21] Appl. No.: 192,474

[22] Filed: Sep. 30, 1980

[30] Foreign Application Priority Data

Oct. 5, 1979 [CH] Switzerland .................... 9000/79

[51] Int. Cl.³ .................................................. F01K 3/00
[52] U.S. Cl. ......................................... 60/659; 60/648; 60/677; 60/652
[58] Field of Search .................. 60/648, 659, 677, 652

[56] References Cited

U.S. PATENT DOCUMENTS 1,726,730  9/1929  Backstrom ............................ 60/659
3,724,214  4/1973  Bryant .............................. 60/648 X Primary Examiner—Allen M. Ostrager
Attorney, Agent, or Firm—Oblon, Fisher, Spivak, McClelland & Maier

[57] ABSTRACT

A steam turbine plant capable of rapidly increasing its output in instances of sudden load jumps, by drawing the necessary process steam from a bleeding point of a turbine during normal operations, while, at the same time, filling a steam accumulator, or keeping full, by means of steam taken from a bleeding point of the high-pressure component of the turbine and/or by live steam. In order to boost the increase in output of the generator the drawing off of process steam from the turbine is interrupted and replaced by process steam from the steam accumulator, so that the condensing component of the turbine automatically receives more steam.

3 Claims, 2 Drawing Figures

METHOD FOR THE RAPID INCREASE IN OUTPUT OF A STEAM TURBINE PLANT

Title of the Invention Method for the rapid increase in output of a steam turbine plant.

BACKGROUND OF THE INVENTION

This invention relates to a method for the rapid increase in output of a steam turbine plant using process steam, and in a particular of a steam turbine plant connected with an electro-generator.

DESCRIPTION OF THE PRIOR ART

In industrial power plants it is often necessary, particularly in power plants connected with steel mills in countries with a limited public utility network, to handle greater positive load jumps. The conventional steam turbine plants now in use can balance such greater positive load jumps only in about one minute, inasmuch as a speedier increase in turbine output is not possible.

SUMMARY OF THE INVENTION

This and other objects are achieved according to the invention by a method of the initially described type, by drawing off the necessary process steam from a bleeder of one turbine during regular operations and, simultaneously filling, or maintaining filled, with steam from at least one drawing-off point of the high-pressure component of a turbine and/or by live steam, a steam accumulator and, for the purpose of a rapid increase of the steam turbine plant output, by interrupting the bleeding of process steam from the turbine and by replacing the interrupted turbine process steam with process steam from the steam accumulator, so that the condensing component of the turbine, or a condensing turbine, immediately receives an increased steam flow.

Advantageously, process steam may be drawn off a bleeder-condenser turbine. Also, the invention may be practiced using a steam turbine plant provided with at least one back pressure turbine to furnish the process steam, as well as condensing turbine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
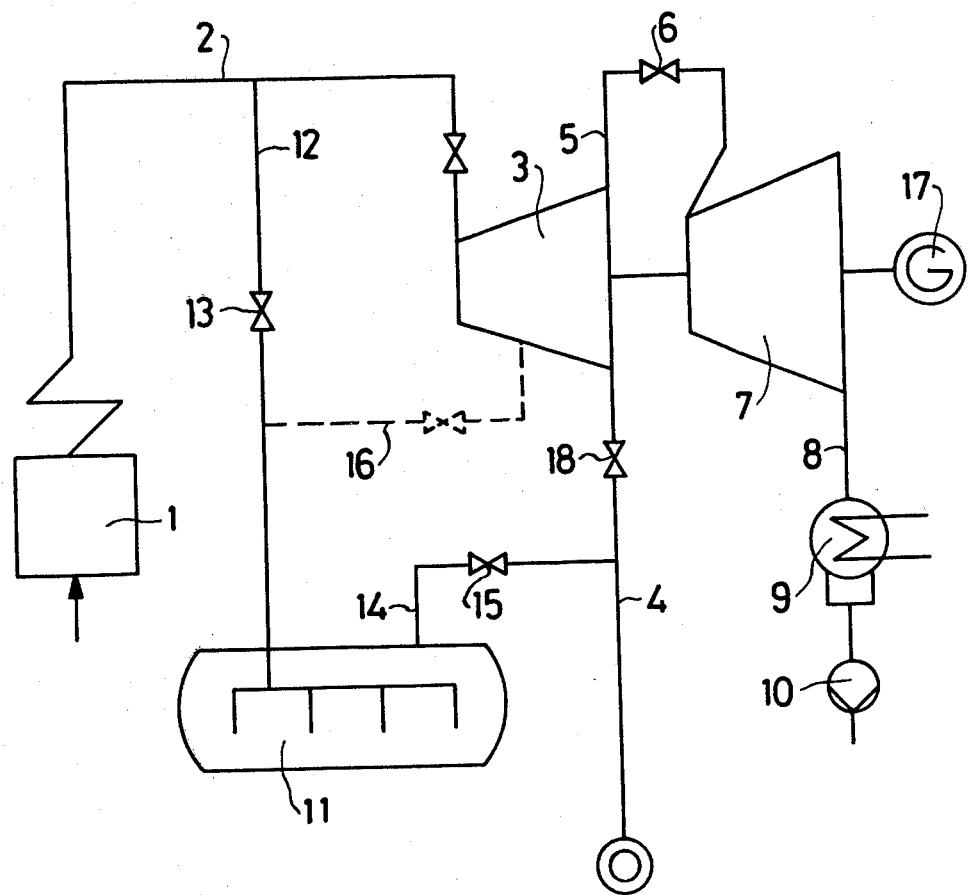
FIG. 1 sketched example is a schematic diagram of an embodiment of a plant for the application of the method of the invention.

Referring now to the drawings, wherein like reference numerals designate identical or corresponding parts throughout the several views, and more particularly to FIG. 1 thereof, in the plant shown, the steam raising unit 1 is connected with a bleeder turbine 3 by means of a live steam line 2. In order to draw off the process steam, which, for instance, is needed for a seawater desalinization plant, a bleeder line 4 is connected with the outlet of the bleeder turbine 3. The outlet of the latter is, in addition, connected with the condensing component 7 of the turbine by means of a connecting line 5 and an overflow valve 6. The outlet of the condensing component 7 is connected with a condenser 9 and a condensed steam pump 10 by means of a connecting line 8.

In addition, a steam accumulator 11 is provided, which, for the purpose of accumulation of steam is connected with the live steam line 2 by means of the connecting line 12, containing a control instrument 13. The steam accumulator 11 in turn, to give off steam, is connected with the bleeder line 4 by an additional connecting line 14 and a control instrument mounted therein 15.

Drawn in a dotted line is a connecting line 16 which is an alternative to connecting line 12 leading to the live steam line 2, and it connects the steam accumulator 11 with one drawing-off point of the high-pressure component of the turbine 3.

The generator operated by turbine 3,7 is designated 17.

During normal operations of the plant, the bleeder turbine 3 through bleeder line 4 furnishes the required process steam.

The steam accumulator 11 is filled with high-pressure steam through connecting line 12 (or 16).

As soon as a sudden load increase occurs, the control instrument 18 mounted in the bleeder line 4 is closed, causing a pressure rise in that section of the line immediately preceeding bleeder line 4. As a consequence, the overflow valve 6 opens completely, resulting in a very rapid increase in the output of electric power. Simultaneously, the valve 15 provided in the connecting line 14 between the steam accumulator 11 and the bleeder line 4, opens in order to prevent a pressure break-down in the process steam network. The lacking process steam now is taken from the steam accumulator 11.

In this manner it is possible to obtain a major increase in output within one to two seconds without interrupting the process steam output into the process steam network.

Figure 2:
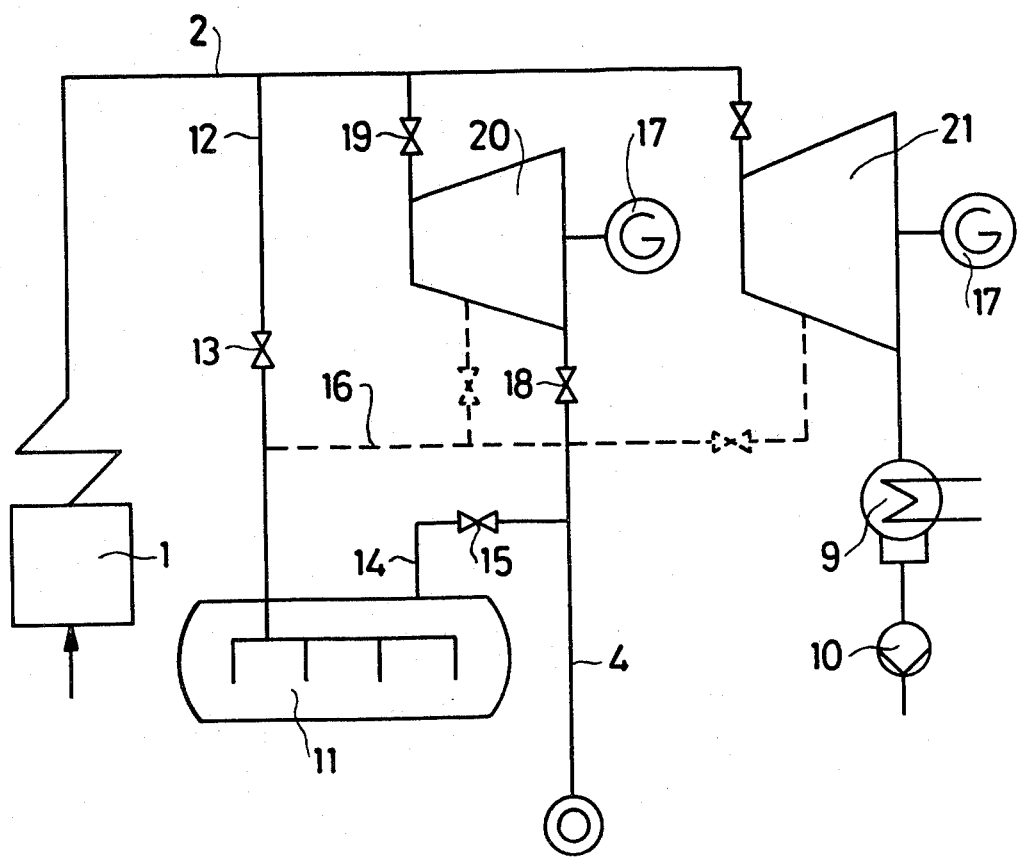
FIG. 2 a schematic diagram of a second embodiment of a plant for the application of the method of the invention.

In the plant shown in FIG. 2, parts analoguous to the plant as shown in FIG. 1 have identical designations.

Turbine 20 is a back-pressure turbine and turbine 21 is a condensing turbine.

As soon as there is a sudden load increase, the control instrument 18 mounted in the bleeder line 4 is closed, causing a pressure rise in the section of line immediately preceding it, causing the inlet valve 19 of the back-pressure turbine 20 to close so that within a short period of time, the entire live steam within the condensing turbine 21 may be utilized, resulting in the desired jump in the output.

The remaining parts do not require a more detailed description, because of the description given in connection with FIG. 1. Obviously, numerous modifications and variations of the present invention are possible in light of the above teachings. It is therefore to be understood that within the scope of the appended claims, the invention may be practiced otherwise than as specifically described herein.

I claim:

1. Method for the rapid increase in output of a steam turbine plant using process steam, and in particular of a steam turbine plant connected with an electro-generator, comprising:

drawing off, during normal operations, the necessary process steam from a bleeder of one turbine;

simultaneously filling, or maintaining full, with steam from at least one drawing-off point of the high-pressure component of a turbine and/or with live steam, a steam accumulator; and, interrupting the drawing off of the process steam from the turbine and replacing the interrupted turbine process steam with process steam from the steam accumulator, for the purpose of rapidly increasing the output of the steam turbine plant so that the condensing component of the turbine or a condensing turbine, respectively, immediately receives an increased flow of steam.

2. Method as claimed in claim 1, further comprising:
the process steam being drawn off a bleeder condenser turbine.

3. Method as claimed in claim 2, including:
using a steam turbine plant provided with at least one back-pressure turbine to furnish the process steam, as well as a condensing turbine.